United States Patent
Balz

[15] 3,700,085
[45] Oct. 24, 1972

[54] MOTOR DRIVEN POSITIONING APPARATUS WITH FORCE-CONTROLLED SHUTOFF SWITCHES

[72] Inventor: Jurgen Balz, Heilbronn Neckar, Germany

[73] Assignee: Firma Helmut Balz GmbH, Heilbronn/Neckar, Germany

[22] Filed: Jan. 13, 1971

[21] Appl. No.: 106,030

[30] Foreign Application Priority Data

Sept. 12, 1970 Germany..........P 20 45 249.7

[52] U.S. Cl...............192/141, 192/142 R, 192/150, 251/134
[51] Int. Cl..........................F16d 71/00, F16k 31/04
[58] Field of Search....192/150, 141, 142 R; 251/134

[56] References Cited

UNITED STATES PATENTS

| 2,208,119 | 7/1940 | Chandler | 192/150 |
| 1,702,479 | 2/1929 | Mosch et al. | 192/150 |
| 2,407,537 | 9/1946 | Chapman | 192/150 X |
| 3,115,791 | 12/1963 | Dean | 74/785 X |

FOREIGN PATENTS OR APPLICATIONS

| 1,547,154 | 10/1968 | France | 251/134 |
| 380,350 | 9/1932 | Great Britain | 251/134 |

Primary Examiner—Allan D. Herrmann
Attorney—Flynn & Frishauf

[57] ABSTRACT

A drive gear is driven by a motor, the gear positioning the positioned member, such as a valve stem, with predetermined force against an obstruction, such as a valve seat. A torque sensing means is provided sensing excess torque applied by the motor to the gear to disconnect the motor. In the disclosed embodiment, the torque sensing element includes a cage swingable over a shaft and carrying, offset with respect to the shaft, a gear transmitting drive power from the motor to the positioned gear. The cage is restrained from swinging about the shaft by a spring; if the torque transmitted exceeds the restraining spring force, the cage will deflect, deflecting movement causing shutoff of the motor. To end-position the valve stem, spring-controlled frictional force is applied to the drive gear when a terminal position is reached causing axial excursion of the drive gear relative to its housing.

10 Claims, 4 Drawing Figures

MOTOR DRIVEN POSITIONING APPARATUS WITH FORCE-CONTROLLED SHUTOFF SWITCHES

CROSS REFERENCE TO RELATED PATENTS

U.S. Pats. Nos. 3,616,884 and 3,647,038.

The present invention relates to a motor drive to position a member with predetermined force against an obstruction, for example a valve member in final valve opening, or closing positions. The valve member itself is connected by means of a spindle with the motor drive, the spindle transmitting axial movement.

It has previously been proposed to position a valve member, such as a valve shut-off element rigidly with a drive. When the positioning force exceeds a predetermined value, the drive is to be disconnected. To this end, a drive gear is located for limited axial movement, and maintained in a centered, neutral position by a pair of springs pressing against bearings located in the housing of the positioning apparatus. The drive gear can move longitudinally with respect to the bearings; the axial movement, by the drive gear (or the bearings, respectively) then cause engagement of a friction member against the end face of the drive gear, to effect coupling of the friction member with the drive gear upon excursion of the drive gear, or the bearings, as the end or terminal position is being reached.

Motor drives of this type have previously been proposed - see applications Ser. 882,974 (Filed Dec. 8, 1969) now U.S. Pat. No. 3,616,884 (Filed July 20, 1968) now U.S. Pat. No. 3,647,038. The apparatus disclosed in the aforementioned applications has the advantage that the interruption of power to the motor depends on the force of application of the positioned member, here a valve element, to an obstruction, such as a valve housing. Operating practice has shown that the friction between the spindle thread and the spindle nut, sliding thereon, is not necessarily constant but rather can vary over a wide range. These variations apparently arise due to differences in surface condition of the mutually engaging thread, caused by dirt, wear on the threads, and lubricating effectiveness, all of which greatly influence the final friction to be overcome by the motor drive. Tests taken during operating conditions have shown that the friction may vary between about $\mu=0.02$ and $\mu=0.2$, depending upon whether the friction is break-away friction, moving friction, and depending on the condition of the engaging threads.

The wide variations in friction between the threads require wide changes in the torque to be supplied to the drive wheel driving the spindle of the positioned element, for example a valve member. To provide for effective force positioning in which the actual positioning force is substantially constant, the drive therefor must be dimensioned to the worst condition, that is, the drive motor as well as the gearing between the drive motor and the wheel driving the spindle must be of a size capable of transmitting torque to overcome the highest expected friction, to avoid damage or destruction of the drive elements. This leads to a substantial overdimensioning of these parts which, in positioning drives having force applications in the order of tons, is highly undesired, since, under normal conditions, the excessive dimensioning of the parts is not utilized. They do, however, require additional space, and are costly.

If the dimensioning of the positioning drive starts from a median design value of, for example, $\mu=0.1$, then an exact positioning with design positioning force is ensured if the friction is below this limiting value. If, however, friction rises to $\mu=0.2$ due to external influences, then the torque to be applied over the drive gear is doubled in order to obtain a pure force-dependent final positioning. This overloads the drive motor, as well as the gear elements; no effective protection against such overload is available.

It is an object of the present invention to provide a positioning drive in which the force of final positioning, exceeding a certain value, disconnects the drive, as above referred to; and which, additionally, is improved in that an overloading of the drive motor, and any gearing between the drive motor and the final positioning gear is avoided.

SUBJECT MATTER OF THE PRESENT INVENTION

Briefly, a torque sensing device is interposed in the gear train between the drive motor and the drive gear, the torque sensing device, upon sensing of excessive torque being transmitted by the gearing, disconnecting the drive independently of the value of the force being applied by the positioning spindle when it reaches the terminal position.

In a preferred form of the invention, the torque sensing device comprises a swingable cage in which a gear is retained, offset from the swing-axis of the cage; the gear is part of a gear train, and the cage is restrained from deflection away from a predetermined position by a spring. If the torque transmitted by the gear exceeds a predetermined value, the cage will deflect against the spring, and the deflecting movement of the cage is utilized to disconnect power to the drive motor.

The drive is smaller and the design values of the various elements can be optimized in comparison to drives which are insensitive to transmitted torque. For normal conditions of friction in the drive threads, the ordinary end-force positioning switching arrangement is used. If, however, due to change of the friction conditions within the gearing, or the spindle thread and nut arrangement, the torque exceeds a certain value, the drive can be disconnected before damage can result. Thus, the force acting on the spindle is held within a wide normal range, to effect disconnection of the motor when the final positioning force has been reached. The force to be transmitted by the motor cannot, however, exceed a certain value so that the torque transmitted by the gearing remains within predetermined limits. This enables precise dimensioning of all parts of the drive, resulting in a good space factor and a drive of high efficiency. Additionally, the drive enables a simplification in number of parts and in the number of types of drives to be stocked since it can be used as a pure torque-sensitive drive regardless of eventual output from the spindle requiring, in addition to the torque sensing, a final end-switching arrangement depending on positioning force.

In a preferred form, the arrangement is so made that a drive gear is provided which, when the force acting on the spindle increases beyond a maximum value, is restrained from movement and, eventually, automatically blocked so that the drive gear wheel itself increases the torque being transmitted, the switching mechanism then being operated by the torque sensing arrangement.

The invention will be described by way of example with reference to the accompanying drawings, wherein.

Figure 1:
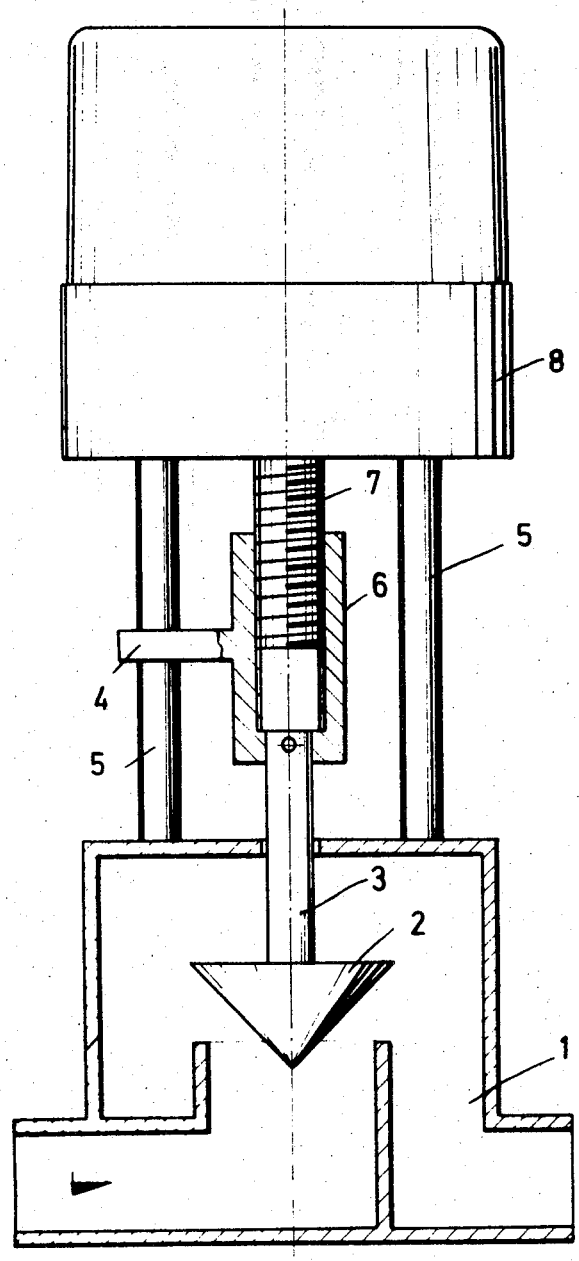
FIG. 1 is a side view of a positioning drive applied to a valve.
Figure 2:
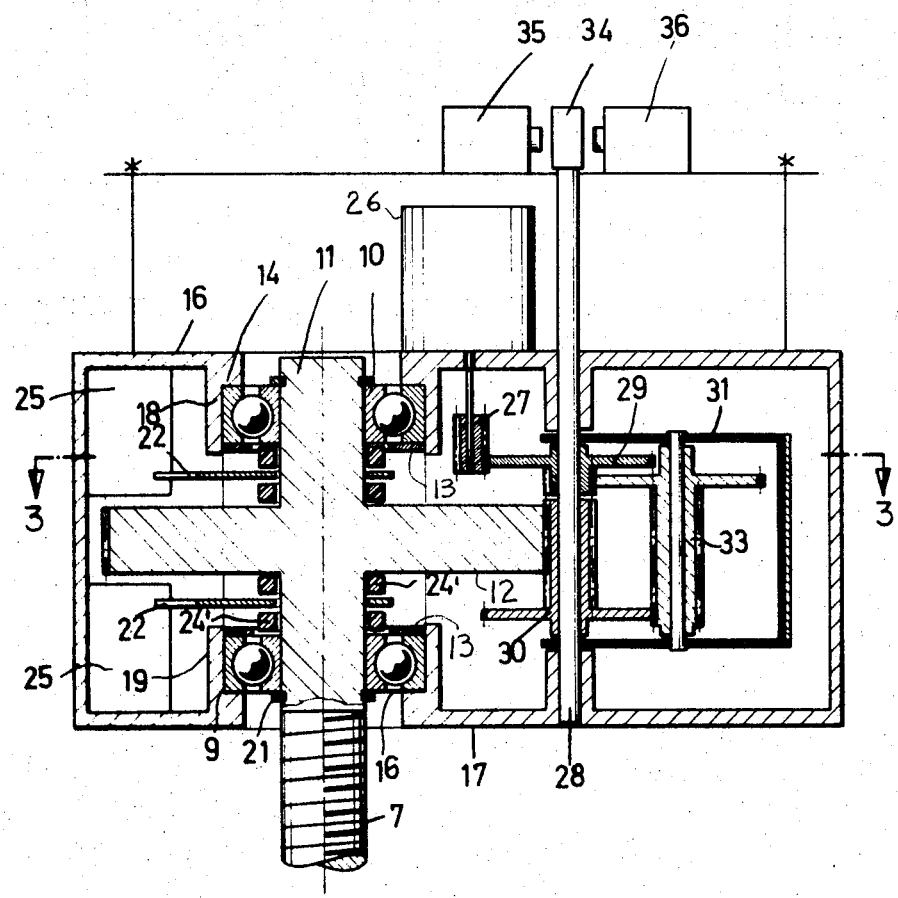
FIG. 2 is an axial cross-sectional view, with the valve omitted, and showing the parts in greater detail.

A valve 1 has a movable valve member 2 connected to a spindle 3 which, by means of a slider 4, surrounding one of a pair of posts 5 is restrained from rotation and movable lengthwise to open or close the valve. The valve spindle 3 is held in a threaded nut 6, which is in threaded engagement with a moving spindle 7, the spindle 7 and nut 6 forming a linearly movable positioning drive. Upon rotation of spindle 7, nut 6 will move longitudinally, to convert the rotary motion of the spindle into longitudinal motion of the valve body 2.

A housing 8 is supported on the posts 5. Spindle 7 extends into the housing 8 and is retained therein by means of a pair of ball bearings 9, 10. Spindle 7 is formed with a cylindrical part 11, extending on both sides of a main drive gear 12, fixed on the spindle 7. The two ball bearings 9, 10 are longitudinally slidable. A pair of essentially U-shaped leaf springs 13 are inserted between the ball bearings 9, 10, see FIG. 4. The leaf springs tend to push the ball bearings 9, 10 against shoulders 14, 15 formed at housing walls 16, 17. The ball bearings 9, 10, are guided radially by extension sleeves 18, 19 of the housing wall. The cylindrical part 11 of spindle 7 has a pair of C-rings 20, 21 bearing against the inner races of the ball bearings 9, 10. A pair of levers 22 are arranged in the region between the main gear 12 and the inner races of ball bearings 9, 10. The central opening 23 of levers 22 is just slightly larger than the outer diameter of cylindrical part 11. Levers 22 are formed at their ends with notches 24 (see FIG. 3) which match with a rib 25 formed on the housing, to restrain the levers against rotation. The inner diameter of opening 23, and notch 24 hold the levers in position without interfering with movement of the spindle cylinder 11. Levers 23 are arranged between a pair of elastic rings 24' which are so dimension that, if the spindle is not loaded, there is a slight axial distance between the drive wheel 12 and the rings, and between the inner race of ball bearings 9, 10 and the rings, respectively.

Spindle 7 and with it main drive gear 12 is driven by a motor 26 located on a housing 8, connected with a pinion 27. Pinion 27 is connected to gear 12 by a gear train. The gear train includes a shaft 28, parallel to spindle 7 and rotatably journalled in the housing 8. Shaft 28 is brought out of the housing. A pair of gears 29, 30, are freely rotatably mounted on the shaft 28. Gear 29 engages with pinion 27. Gear 30 engages with drive wheel 12. The gears 29, 30, are, in turn, interconnected by a gear 33. Gear 33 is located in a cage 31 which is swingably mounted about shaft 28, and capable of lateral excursion, that is, up or down in FIG. 3.

Cage 31 supports shaft 32 on which the gear 33 is mounted. The cage 31 is fixed to shaft 28, so that shaft 28 swings with the swinging motion of the cage 31. Shaft 28 additionally is formed with a lever 34 which, upon deflection of the shaft 28 from a center, or rest position operates a pair of associated switches 35, 36 depending upon the direction of deflection.

Cage 31 may be formed in the general shape of a U-shaped bail, or frame. It is formed with a flat surface 37 which bears against a leaf spring 38, secured at 39 in housing 8, for example by spot welding, by a groove, or any other suitable attachment means. Leaf spring 38 retains the cage 31 in the center, or neutral position illustrated in FIG. 3. If the torque on the cage 31 exceeds a predetermined value, the cage 31 will snap out of the central position shown in FIG. 3 and deflect laterally, causing deflection of the shaft 28 and thus operation of the limit switch.

Figure 3:
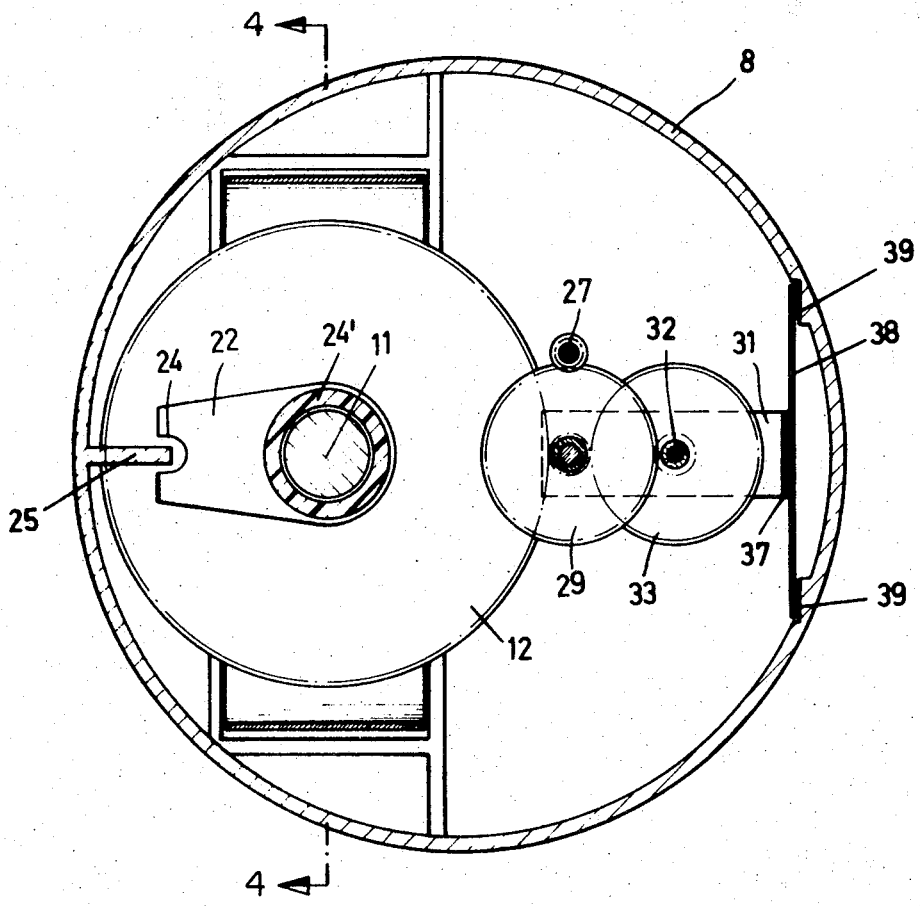
FIG 3 is a top view taken along lines 3—3 of FIG. 2.
Figure 4:
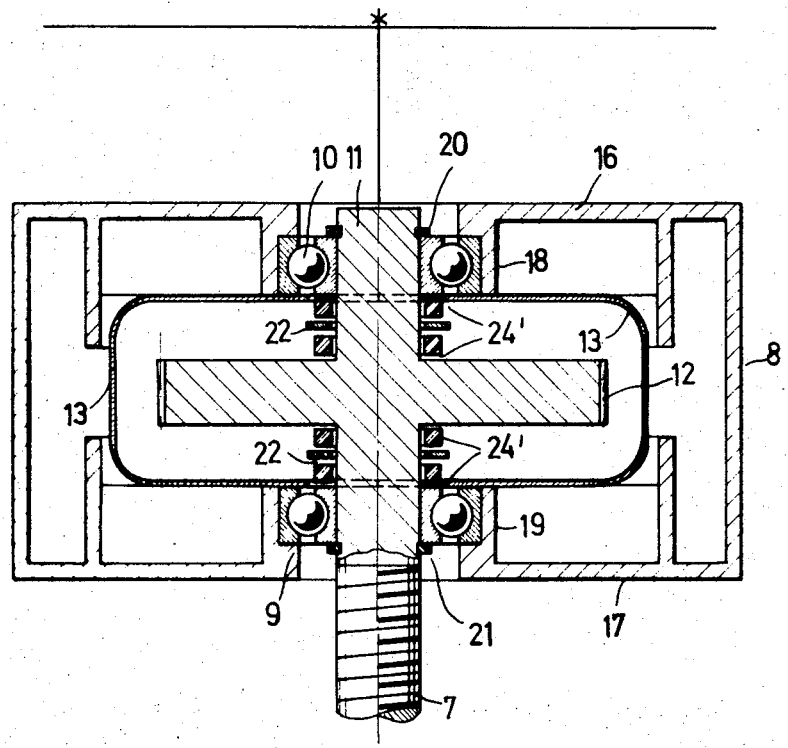
FIG. 4 is a cross-sectional view taken along lines 4—4 of FIG. 3.

Operation: Upon starting motor 26, spindle 7 is rotated over the gear train formed by pinion 27, gears 29, 33, 30 and main gear 12. Cage 31 is at the rest position retained as illustrated in FIG. 3. Elastic rings 24' are freely movable in axial direction between the drive gear 12 and the inner races of ball bearings 9, 10. Operating levers 22 are loose, and rotation of the spindle 11 is not impeded in any way. When the operated member reaches the limit position at which it meets an obstruction, and specifically, as illustrated, when the valve member 2 reaches the valve seat, an increasing axial force is applied to spindle 7 which has as a result that drive wheel 12 will tend to move upwardly. Upon excursion of the drive wheel upwardly, the lower ball bearing 9 is carried along by the C-ring 21, the upper ball bearing 10 itself bearing against the housing shoulder 16. Upon increasing excursion, the distance between the gear 12 and the inner races of the bearings 9, 10 will decrease until the elastic rings 24' on both sides of the operating levers 22, are compressed, thus forming a frictional engagement between the drive wheel 12 and the two operating levers 22. Since the operating levers 22 are restrained from rotation by the engagement of notch 24 with housing rib 25, a drag force is applied to main gear 12 which will tend to stop rotation of the gear 12. The value of the axial force acting on spindle 7 which causes blocking of the drive wheel 12 is determined by the strength of springs 13 which counteract the axial force applied against the spindle. As soon as the drive wheel 12 is effectively restrained from rotation, the torque transmitted over the gear 33 and shaft 32, mounted on the cage 31, will increase. This will tend to deflect cage 31 from the position shown in FIG. 3, against the force of leaf spring 38. When the torque reaches a limiting value, the deflecting force will be so great that the cage will snap out of the neutral position and cause deflection of the cage, with the deflection of shaft 28 and engagement of lever 34 with one or the other of the switches 35, 36 which disconnect the drive motor.

The aforementioned operation describes the sequence under normal circumstances, that is, when the friction $\mu$ between the spindle 7 and the spindle nut 6 is so small that a deflection of the cage 31 will only occur when the drive wheel is constrained from further movement by the terminal seating force. Under the aforementioned unusual operating conditions, however, the friction $\mu$ in the drive strain formed of threads 6, 7, may increase substantially. The torque to be transmitted by the pinion 27 over gearing 29, 33, 30, to drive main gear 12 will then be so great that the cage 31 will deflect from its neutral position (FIG. 3) and thus disconnect the motor. The value of the torque upon deflection of cage 31 is determined by the strength of leaf spring 38; it can be adjusted by suitable dimensioning of the leaf spring, by pre-biasing or other suitable means not shown and well known in the art. Switches 35, 36 can be connected not only to disconnect the motor but also to operate an alarm circuit; they can, for example, be additionally interconnected with limit switches determining the position of the spindle 7 so that seating with force less than the design force can be indicated, for example, to show to operating personnel that premature operation of the switches 35, 36 occurred and that the positioning apparatus needs cleaning or maintenance.

The embodiment as described illustrates a drive gear 12 which is secured to spindle 7, on which a nut 6 is threaded, restrained against rotation. Of course, the position of nut and spindle can be reversed, so that the spindle connected to the valve member is restrained from rotation, and the nut is driven and connected to gear 12. Various other changes and modifications may be made, for example as required by specific uses and applications, within the inventive concept.

I claim:

1. Motor driven positioning apparatus to place a positioned member with predetermined force against an obstruction, having switch means 34, 36 disconnecting the motor 26 when the force transmitted by the drive to the positioned member 2 exceeds a predetermined value comprising
   a housing 8;
   a drive gear 12 coupled to the positioned member;
   means 9, 10; 14, 15; 16, 17, 18, 19; 20, 21 retaining said drive gear in said housing and permitting axial excursion of said drive gear with respect to said retaining means;
   spring means 12 maintaining said gear in neutral, central position with respect to the permitted excursion relative to said retaining means;
   locking means 22, 24, 25 located to be frictionally engageable by said drive gear upon relative axial excursion thereof to apply a drag force on said drive gear, said drag force increasing with increasing axial excursion of the drive gear 12 and locking the drive gear upon full permitted excursion of said drive gear against the force of said spring means 13;
   gear means 27, 29, 33, 30 interconnecting said motor 26 and said drive gear 12;
   and means 28, 31, 38 sensing torque transmitted by said gear means and actuating said switch means to interrupt power to said motor upon sensing of torque beyond a predetermined value and independently of the axial force acting on the drive gear.

2. Positioning apparatus according to claim 1 wherein;
   said torque sensing means includes a displaceable element 31 being displaced upon transmission of torque beyond said predetermined value, displacement of said element actuating said switch means.

3. Positioning apparatus according to claim 1 wherein said locking means 22, 24, 25 comprises a pair of levers 22;
   means 24, 25 restraining said levers from rotation;
   and wherein said drive gear retaining means includes a pair of bearings 9, 10 mounted in said housing for relative axial excursion with respect thereof; said bearings, upon said relative axial excursion, providing axial engagement forces between said levers, said bearings, and said drive gear.

4. Positioning apparatus according to claim 1 wherein said sensing means includes a cage 31 and a shaft 28 secured to the cage, the cage and shaft being swingably mounted in said housing;
   a gear 33 rotatably mounted in said cage on an axis remote from the shaft 28;
   and said gear means comprises a gear 29 interconnecting the motor and the gear 33 on the cage and a gear 30 engaging the drive gear 12 and the gear on the cage 33, said gear on the cage 33 coupling the gear 29 driven by the motor and the gear 30 driving the drive gear 12 together to provide a deflecting force to the shaft 28 upon transmission of torque from the motor to the drive gear.

5. Positioning apparatus according to claim 4 including resilient means 37, 38 restraining said shaft 28 from deflection and holding said shaft in a rest position, said resilient means permitting deflection of said shaft when the torque transmitted over gear means exceeds a predetermined value;
   said switch means being located to be actuated upon deflection of said shaft.

6. Positioning apparatus according to claim 4 including resilient means 37, 38 holding said shaft 28 in a rest position and restraining said shaft from deflection, said resilient means and said shaft being mutually engageable by a snap-action coupling having a predetermined snap force.

7. Positioning apparatus according to claim 4 including a flat surface 37 rotatable with said shaft;
   and spring means 38 mounted in said housing and bearing against and engaging said flat surface.

8. Positioning apparatus according to claim 4 wherein the shaft 28 extends through the housing for said apparatus, said switch means being located on said housing to be engageable by said shaft upon deflection thereof.

9. Positioning apparatus according to claim 1 including a threaded spindle 7 driven by said drive gear 12 and an engaging threaded member 6 in engagement with the threads on said spindle and restrained from rotation, said threaded member being coupled to the element being positioned.

10. Positioning apparatus according to claim 9 in combination with a valve, wherein said positioned member is a valve element movable longitudinally within the valve, against a valve seat, the predetermined force being the seating force of said valve element.

* * * * *